US008489214B2

(12) United States Patent
Shen et al.

(10) Patent No.: US 8,489,214 B2

(45) Date of Patent: Jul. 16, 2013

(54) DOCK WITHOUT A POWER SOURCE FOR DIGITAL DEVICES

(75) Inventors: Xiao Xiang Shen, Shanghai (CN); Bin Yu, Shanghai (CN); Hock Guan Tan, Singapore (SG)

(73) Assignee: Creative Technology Ltd, Singapore (SG)

( * ) Notice: Subject to any disclaimer, the term of this patent is extended or adjusted under 35 U.S.C. 154(b) by 435 days.

(21) Appl. No.: 12/526,506

(22) PCT Filed: Feb. 7, 2007

(86) PCT No.: PCT/CN2007/000409

§ 371 (c)(1), (2), (4) Date: Mar. 18, 2010

(87) PCT Pub. No.: WO2008/095342

PCT Pub. Date: Aug. 14, 2008

(65) Prior Publication Data

US 2010/0183170 A1 Jul. 22, 2010

(51) Int. Cl.

*G06F 17/00* (2006.01)

*H04R 1/30* (2006.01)

(52) U.S. Cl.

USPC .............. 700/94; 381/337; 381/338; 381/341

(58) Field of Classification Search

USPC ............................................................ 700/94

See application file for complete search history.

(56) References Cited

U.S. PATENT DOCUMENTS

| | | | | |
|---|---|---|---|---|
| 5,832,079 | A * | 11/1998 | Rabe | 379/433.13 |
| 5,963,640 | A * | 10/1999 | Rabe | 379/433.02 |
| 8,098,867 | B2 * | 1/2012 | Hampton et al. | 381/345 |
| 2002/0009195 | A1 * | 1/2002 | Schon | 379/454 |
| 2005/0163334 | A1 * | 7/2005 | Suprapmo et al. | 381/337 |

* cited by examiner

*Primary Examiner* — Joseph Saunders, Jr.

(74) *Attorney, Agent, or Firm* — Creative Technology Ltd

(57) ABSTRACT

There is provided a dock without a power source for a portable digital device with at least one integrated speaker driver. The dock may include a platform for placement of the portable digital device; a protrusion located at the platform for connection of the portable digital device with the dock with the protrusion including a slot for egress of air from at least one hole in a casing of the portable digital device to the dock; and at least one primary chamber to receive air from the portable digital device with the at least one primary chamber having a vented port for the egress of air. Advantageously, sound from the at least one integrated speaker driver is amplified when the portable digital device is connected to the dock. The connection of the portable digital device with the dock may be securable. A horn may be included in an exterior facing opening of the vented port, as the horn advantageously improves aspects of sound such as, for example, sound directivity, radiation efficiency or both of the aforementioned.

16 Claims, 2 Drawing Sheets

DOCK WITHOUT A POWER SOURCE FOR DIGITAL DEVICES

FIELD OF INVENTION

This invention relates to a dock for digital devices, specifically but not exclusively to a media player dock without a power source that is able to amplify sounds of connected digital devices.

BACKGROUND

It is common to see portable digital devices becoming increasingly compact. Demand for these compact devices is very high as is the demand for accessories for such devices. A popular accessory used with such compact devices is a set of speakers. However, the size of the set of speakers is usually made to be compact in order to match the appearance of the portable digital devices. Unfortunately, the compactness of such speakers limits box volume and thus, prevents the use of a vented box system design. As such, closed box-small volume designs are often used for such speakers.

In the field of acoustics engineering, it is widely acknowledged that a low cutoff frequency of a loudspeaker system is affected by enclosure volume of the loudspeaker system. This is clearly demonstrated by the following equation:

$$f_c = f_s\sqrt{1 + \frac{V_{AS}}{V_B}}$$

where $f_c$=resonance frequency of enclosure, $f_s$=driver resonance frequency, $V_{AS}$=equivalent volume and $V_B$=enclosure volume. Thus, it can be seen that the larger the enclosure volume, the lower the resonance frequency of enclosure (cutoff frequency).

Based on the aforementioned equation, it can be seen that the closed box-small volume designs would have inadequate low frequency reproduction.

Some of the aforementioned speaker systems do not have their own power supply. They draw power from the connected portable digital device to power speaker drivers, and correspondingly drains power from the portable digital device, significantly reducing a duration of usage for the portable digital device.

SUMMARY

There is provided a dock without a power source for a portable digital device with at least one integrated speaker driver. The dock may include a platform for placement of the portable digital device; a protrusion located at the platform for connection of the portable digital device with the dock with the protrusion including a slot for egress of air from at least one hole in a casing of the portable digital device to the dock; and at least one primary chamber to receive air from the portable digital device with the at least one primary chamber having a vented port for the egress of air. Advantageously, sound from the at least one integrated speaker driver is amplified when the portable digital device is connected to the dock. The connection of the portable digital device with the dock may be securable. A horn may be included in an exterior facing opening of the vented port, as the horn advantageously improves aspects of sound such as, for example, sound directivity, radiation efficiency or both of the aforementioned.

It is preferable that the air from the portable digital device is from the speaker chamber, the air being primarily excited by vibrations from the at least one speaker driver. The vented port may affects the pitch of sound amplified by the dock. It is preferable that the portable digital device is a device like, for example, a media player, a mobile phone, an electronic organizer, or any combination of the aforementioned.

The dock may further including a first vertical wall, a second vertical wall, and a base. The surfaces of the vertical walls and base may form a passage way for amplification of the sound from the at least one integrated speaker driver of the portable digital device. It is advantageous that the surfaces of the vertical walls and base are smooth and curved to improve the sensitivity of the sound from the at least one integrated speaker driver of the portable digital device.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

Figure 1:
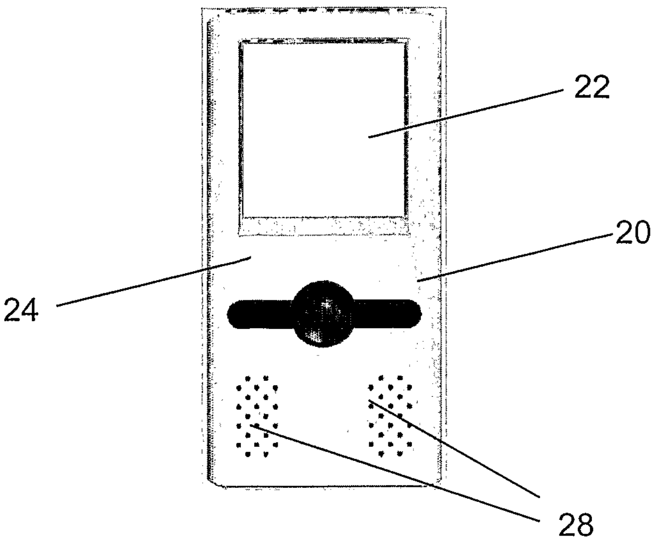
FIG. 1 shows a front view of a portable digital device used with a preferred embodiment of the present invention.
Figure 4:
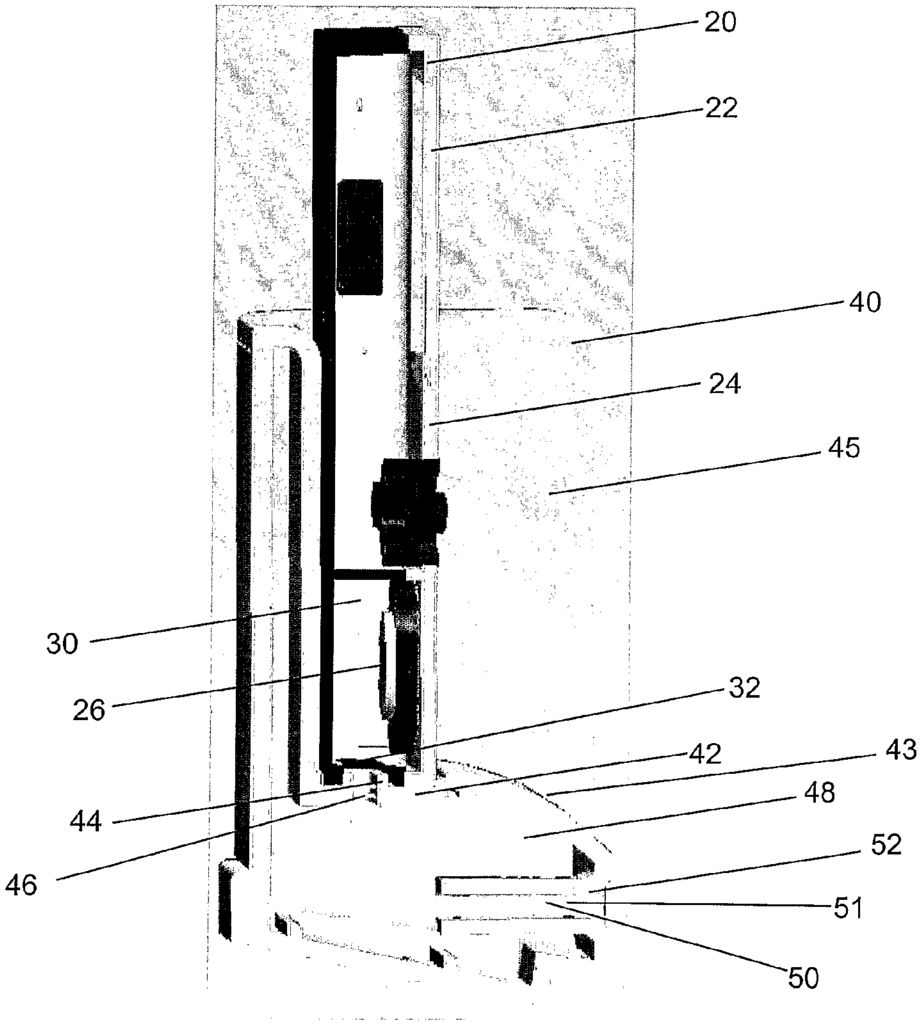
FIG. 4 shows a cut-away view of the preferred embodiment of the present invention when connected to the portable digital device.

Referring to FIGS. 1 and 4, there is provided a portable digital device 20 that is suitable for use with a preferred embodiment of the present invention. The portable digital device 20 is a portable media player that may have either flash memory or a hard disk drive. While the portable digital device 20 is shown to have a display 22, this aspect of the portable digital device 20 is not essential when the portable digital device 20 is used with a preferred embodiment of the present invention. The portable digital device 20 should include at least one speaker driver 26 incorporated within a casing 24 of the portable digital device 20. Perforations 28 are made in the casing 24 to enable transmission of sound from the at least one speaker driver 26.

The at least one speaker driver 26 may be enclosed within a speaker chamber 30 of the portable digital device 20. Each speaker driver 26 may have a single speaker chamber 30. The casing 24 has an opening 32 that allows passage of air into and out from the chamber 30. It is apparent that the chamber 30 is not completely sealed. The opening 32 may be sealed using a removable plug to prevent unwanted particles from entering the speaker chamber 30. Retractable or snap-shut baffles may be used to cover the opening 32.

It should be noted that the portable digital device may also be, for example, a mobile phone, an electronic organizer, or any combination of the aforementioned.

Figure 2:
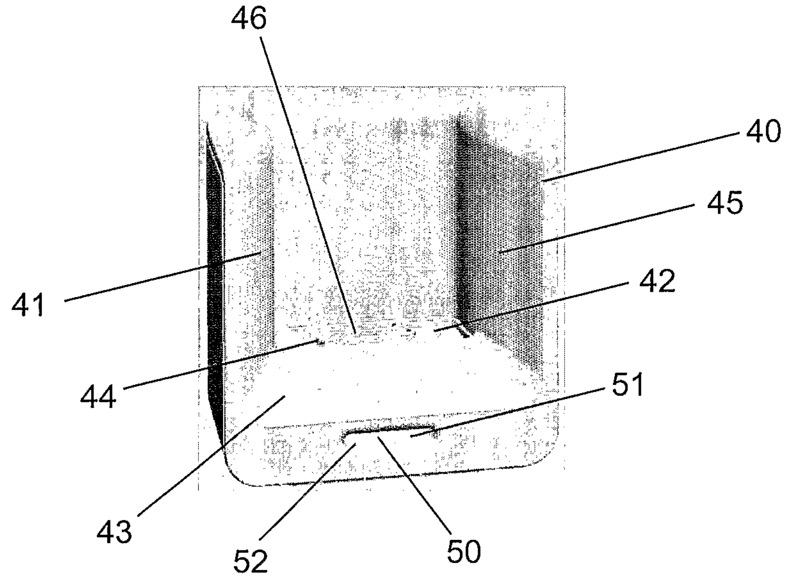
FIG. 2 shows a perspective view of the preferred embodiment of the present invention.
Figure 3:
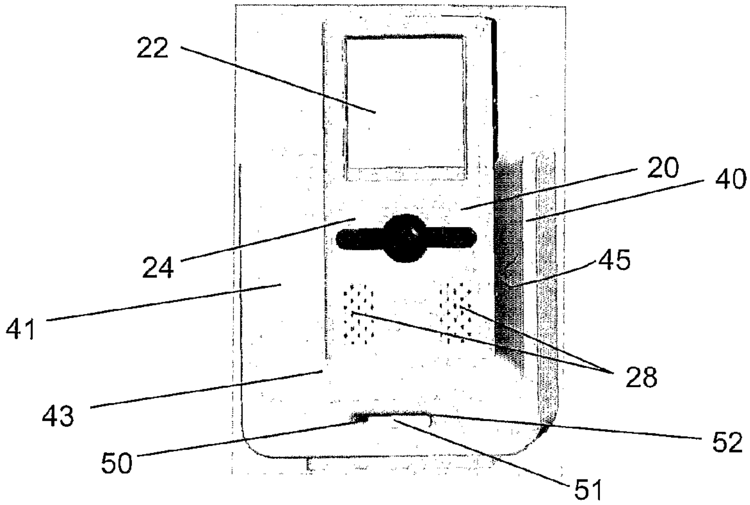
FIG. 3 shows a perspective view of the preferred embodiment of the present invention when connected to the portable digital device.

Referring to FIG. 2, there is shown a perspective view of a dock 40 for a portable digital device with at least one integrated speaker driver. FIGS. 3 and 4 show different views of the dock 40 when in use with the portable digital device 20. The dock 40 does not have an independent power source as power is not required to operate the dock 40. The dock 40 includes a platform 42 for placement of the portable digital device 20. The platform 42 may either be designed to receive/support a specific portable digital device or be designed to receive/support any portable digital device. There may be a protrusion 44 located at the platform 42. The protrusion 44 may be for connection of the portable digital device 20 with the dock 40. The protrusion 44 may allow the portable digital device 20 to be securable with the dock 40 such that vibration of the dock 40 due to the portable digital device 20 is minimised. The portable digital device 20 may be frictionally secured using a precise fit between the protrusion 44 and rim of the opening 32 of the casing 24. The precise fit between the protrusion 44 and the rim of the opening 32 of the casing 24 may be air-tight and prevent air from escaping from gaps between the protrusion 44 and the rim of the opening 32. Either the protrusion 44 or the rim of the opening 32 may be lined with a compliant material like fabric or rubber to ensure the precise fit between the protrusion 44 and the rim of the opening 32 of the casing 24. A compliant material with a high coefficient of friction like rubber also aids in allowing the portable digital device 20 to be securable with the dock 40.

The dock 40 includes a first vertical wall 41, a base 43 and a second vertical wall 45 which aids in amplification of sound from at least one of the speaker drivers 26 of the portable digital device 20 as the surfaces of the vertical walls 41, 43 and base 43 form a passage way for the sound. Surfaces of the first vertical wall 41 and the second vertical wall 45 may be smooth and curved to increase radiation area similar to an effect provided when using a horn. Similarly, a surface of the base 43 may also be smooth and curved. The curved surfaces of the vertical walls 41, 43 and base 43 may provides a flared opening for the sound similar to a horn. An increase in radiation area would enhance sensitivity of sound being generated by the portable digital device 20.

The protrusion 44 may include a slot 46 for egress of air from the opening 32 in the casing 24 of the portable digital device 20 into the dock 40. The dock 40 may include at least one primary chamber 48 to receive air from the speaker chamber 30 of the portable digital device 20. Air from the speaker chamber 30 of the portable digital device 20 passes into the primary chamber 48 through the opening 32 in the casing 24. The air from the speaker chamber 30 is primarily excited by vibrations from the at least one speaker driver 26. While the primary chamber 48 shown in FIG. 4 is substantially “L” shaped when viewed in a cut-away view, it should be noted that the chamber 48 is not restricted to this shape. The primary chamber 48 essentially increases the volume of the speaker chamber 30 of the portable digital device 20. Having a larger speaker chamber volume allows for greater flexibility in a design for a vented system (chamber and port) which may lower low cutoff frequency. As such, low frequency reproduction is extended to lower frequency range.

The primary chamber 48 may also have a vented port 50 for the egress of air. When the portable digital device 20 is connected to the dock 40, sound from the at least one integrated speaker driver 26 may be amplified. The vented port 50 affects the pitch of sound amplified by the dock 40. Varying dimensions of the vented port 50 may affect the frequency of sound being amplified.

A horn 52 may be included in an exterior facing opening 51 of the vented port 50. The horn 52 may improve aspects of sound such as, for example, sound directivity, radiation efficiency or both of the aforementioned.

Whilst there has been described in the foregoing description preferred embodiments of the present invention, it will be understood by those skilled in the technology concerned that many variations or modifications in details of design or construction may be made without departing from the present invention.

What is claimed is:

1. A dock without a power source for a portable digital device with at least one integrated speaker driver associable with a low cutoff frequency, the dock comprising:

a platform for placement of the portable digital device;

a first vertical wall, a second vertical wall and a base forming a passage way for sound emitted from the at least one integrated speaker driver, wherein the surfaces of the base, first and second walls are curved to provide a flared opening so as to aid in amplification of the emitted sound;

a connector located at the platform, the connector being configurable to secure the portable digital device to the dock, the connector including a slot for egress of air from at least one hole in a casing of the portable digital device to the dock; and at least one primary chamber to receive air from the portable digital device, the at least one primary chamber being shaped and dimensioned in a manner so as to effectively increase the speaker chamber volume of the portable digital device when the portable digital device is connected to the dock, thereby effectively lowering the low cutoff frequency.

2. The dock of claim 1, wherein the air from the portable digital device is from a speaker chamber enclosing the at least one speaker driver, the air being primarily excited by vibrations from the at least one speaker driver.

3. The dock of claim 1, wherein the at least one primary chamber comprises a vented port for the egress of air; and wherein a horn is included in an exterior facing opening of the vented port, the horn improving aspects of sound selected from the group consisting of: sound directivity, radiation efficiency and both of the aforementioned.

4. The dock of claim 1, wherein the at least one primary chamber comprises a vented port for the egress of air; and wherein the vented port affects the pitch of sound amplified by the dock.

5. The dock of claim 1, wherein the portable digital device is selected from the group consisting of: a media player, a mobile phone, an electronic organizer, and any combination of the aforementioned.

6. The dock of claim 1, wherein the surfaces of the vertical walls and base are smooth and curved.

7. The dock of claim 1, wherein the connection of the portable digital device with the dock is securable by having the connector configured to protrude into the at least one hole in the casing of the portable digital device.

8. The dock of claim 1, wherein the connection of the portable digital device with the dock is air-tight.

9. A system, comprising:

a portable digital device comprising:

at least one integrated speaker driver associable with a low cutoff frequency; and a casing having at least one hole; and a dock comprising:

a platform for placement of the portable digital device;

a first vertical wall, a second vertical wall, and a base forming a passage way for sound emitted from the at least one integrated speaker driver, wherein the surfaces of the base, first and second walls are curved to provide a flared opening so as to aid in amplification of the emitted sound;

a connector located at the platform, the connector being configurable to secure the portable digital device to the dock, the connector including a slot for egress of air from the at least one hole in the casing of the portable digital device to the dock; and at least one primary chamber to receive air from the portable digital device, the at least one primary chamber being shaped and dimensioned in a manner so as to effectively increase the speaker chamber volume of the portable digital device when the portable digital device is connected to the dock, thereby effectively lowering the low cutoff frequency.

10. The system of claim 9, wherein the portable digital device further comprises a speaker chamber enclosing the at least one speaker driver, and wherein the air from the portable digital device is from the speaker chamber, the air being primarily excited by vibrations from the at least one speaker driver.

11. The system of claim 9, wherein the at least one primary chamber comprises a vented port for the egress of air; and wherein a horn is included in an exterior facing opening of the vented port, the horn improving aspects of sound selected from the group consisting of: sound directivity, radiation efficiency and both of the aforementioned.

12. The system of claim 9, wherein the at least one primary chamber comprises a vented port for the egress of air; and wherein the vented port affects the pitch of sound amplified by the dock.

13. The system of claim 9, wherein the portable digital device is selected from the group consisting of: a media player, a mobile phone, an electronic organizer, and any combination of the aforementioned.

14. The system of claim 9, wherein the surfaces of the vertical walls and base are smooth and curved.

15. The system of claim 9, wherein the connection of the portable digital device with the dock is securable by having the connector configured to protrude into the at least one hole in the casing of the portable digital device.

16. The system of claim 9, wherein the connection of the portable digital device with the dock is air-tight.

* * * * *